United States Patent [19]

Inariba

[11] Patent Number: 4,695,419
[45] Date of Patent: Sep. 22, 1987

[54] MANUFACTURE OF A MINIATURE ELECTRIC MOTOR

[76] Inventor: Tokuzo Inariba, 906 Kamiuma-Mansion, 2-9, Kamiuma 4-chome, Setagaya-ku, Tokyo, Japan

[21] Appl. No.: 854,701

[22] Filed: Apr. 23, 1986

Related U.S. Application Data

[63] Continuation of Ser. No. 655,665, Sep. 28, 1984, abandoned.

[30] Foreign Application Priority Data

Sep. 28, 1983 [JP] Japan .................. 58-177889

[51] Int. Cl.$^4$ ........................... B29C 45/14
[52] U.S. Cl. ........................... 264/259; 29/596; 29/598; 264/263; 264/269; 264/272.19
[58] Field of Search .......... 264/272.19, 272.2, 274, 264/277, 279; 29/43, 194, 596, 598, 269, 259, 263

[56] References Cited

U.S. PATENT DOCUMENTS

| | | | |
|---|---|---|---|
| 3,502,914 | 3/1970 | Cox | 264/272.2 |
| 3,549,918 | 12/1970 | Croymans | 310/49 R |
| 3,678,311 | 7/1972 | Mattingly | 310/164 |
| 3,691,414 | 9/1972 | Kappius | 310/164 |
| 3,904,902 | 9/1975 | Inariba | 310/162 |
| 3,979,822 | 9/1976 | Halm | 264/272.2 |
| 4,009,406 | 2/1977 | Inariba | 310/164 |
| 4,015,154 | 3/1977 | Tanaka et al. | 264/272.2 |
| 4,052,630 | 10/1977 | Inariba | 310/162 |
| 4,056,744 | 11/1974 | Blanchard | 310/162 |
| 4,185,214 | 1/1980 | Gerber | 310/40 MM |
| 4,255,681 | 3/1981 | Gerber | 310/40 MM |
| 4,540,536 | 9/1985 | Altmann et al. | 264/272.19 |

FOREIGN PATENT DOCUMENTS

| | | | |
|---|---|---|---|
| 2615419 | 10/1977 | Fed. Rep. of Germany | 310/194 |
| 0068857 | 5/1980 | Japan | 310/40 MM |
| 0074348 | 6/1980 | Japan | 310/194 |
| 0040349 | 3/1982 | Japan | 264/272.2 |
| 0033957 | 2/1983 | Japan | 310/40 MM |

Primary Examiner—James Lowe
Attorney, Agent, or Firm—Armstrong, Nikaido, Marmelstein & Kubovcik

[57] ABSTRACT

In a miniature electric motor employing therein pole teeth adapted to be energized by means of a coil accommodated in a bobbin, the improvement in which the pole teeth are fixedly unified with a non-magnetic material into a mass. In an electric motor having such a fixedly unified pole teeth mass structure incorporated therein, the high precision, mutual positional relationship of the constituent parts can be ensured. Moreover, since the pole teeth are formed in a unitary mass, machine workings such as cutting, grinding, and the like can be applied to the unitary mass without restriction, thereby to enable the spacing between the rotor and stator to be small and uniform, leading to increase in efficiency of the electric motor.

10 Claims, 23 Drawing Figures

FIG. 1
PRIOR ART
FIG. 2
PRIOR ART
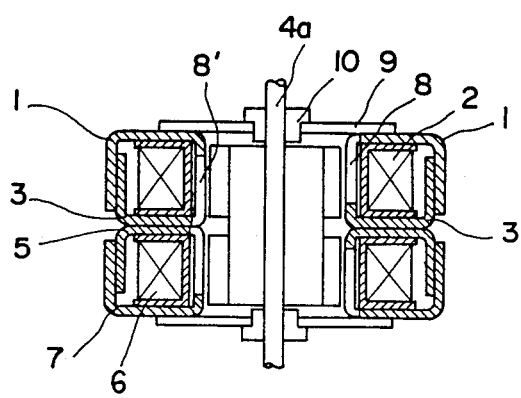
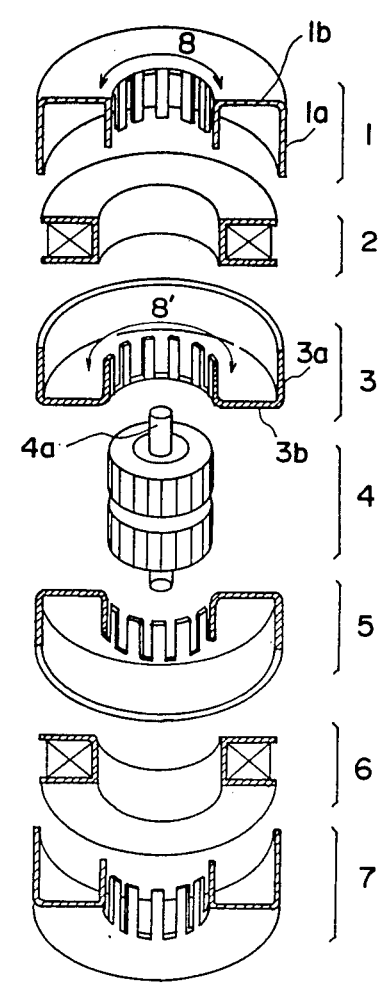

FIG. 3
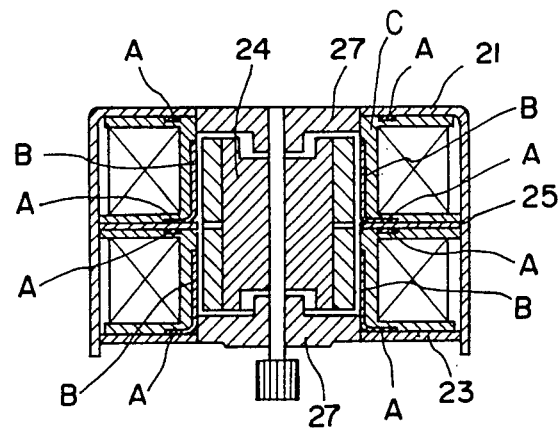
FIG. 4-(a)
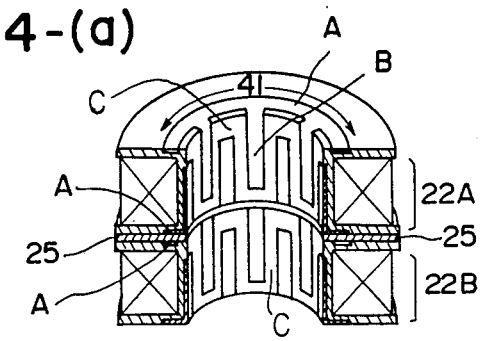
FIG. 4-(b)
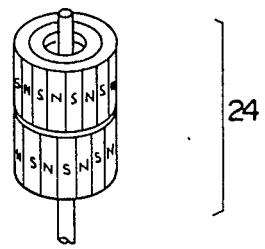

FIG. 5
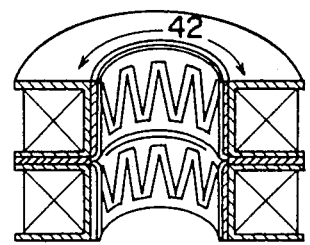
FIG. 6-(a)
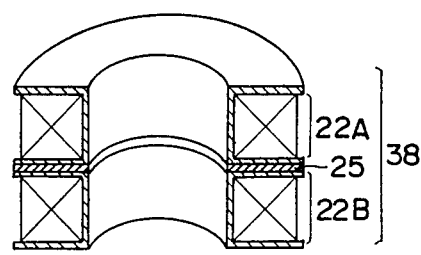
FIG. 6-(b)
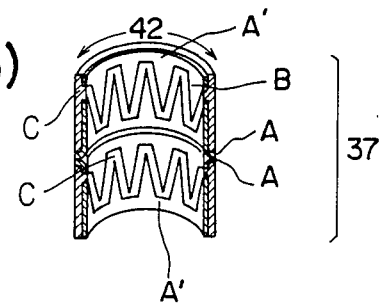

FIG. 9
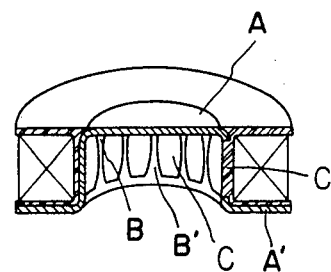
FIG. 10-(a)
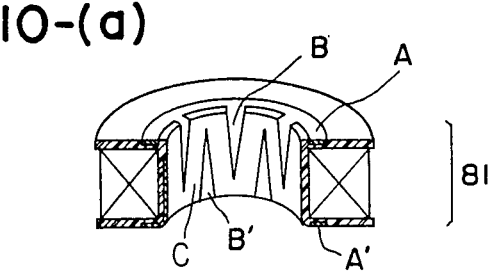
FIG. 10-(b)
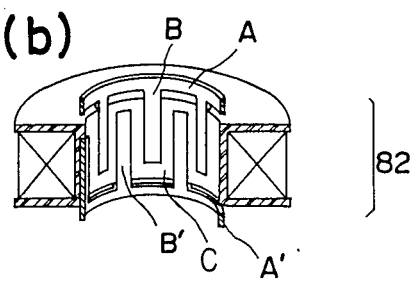

FIG.11
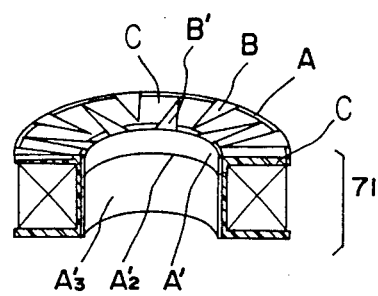
FIG.12-(a)
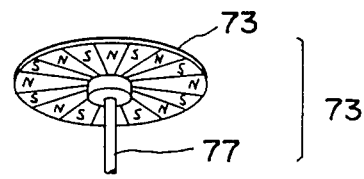
FIG.12-(b)
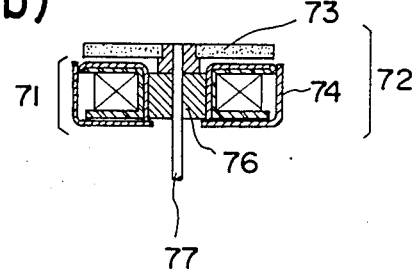

FIG. 13
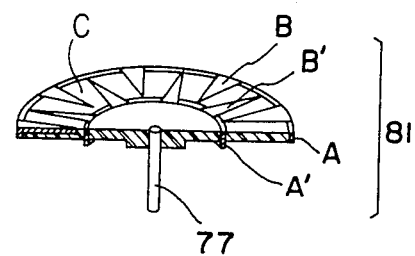
FIG. 14-(a)
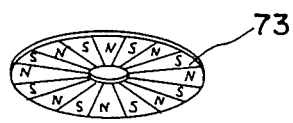
FIG. 14-(b)
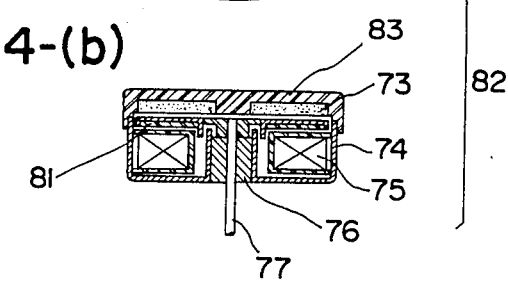

MANUFACTURE OF A MINIATURE ELECTRIC MOTOR

This application is a continuation of application Ser. No. 655,665 filed 9/28/84 now abandoned.

BACKGROUND OF THE INVENTION

This invention relates to a miniature electric motor. More particularly, the present invention is concerned with a miniature electric motor comprising a plurality of pole teeth of soft magnetic material, a magnet for producing torque between the magnet and the pole teeth, a coil for energizing the pole teeth and a yoke portion adapted to be energized by the coil and wherein the pole teeth adapted to be energized by the coil accommodated in a bobbin are fixed together by means of a non-magnetic material into a mass to form a composite pole teeth structure, thereby enhancing precision in assembling the constituent parts of the miniature electric motor, which leads to improved performance of the miniature electric motor.

Conventionally, a miniature electric motor is of a structure that pole teeth, a yoke, a casing, etc., each made of soft magnetic material, are assembled into a unit part construction and then a predetermined number of such unit part constructions are stacked one upon another. Therefore, cumulative error is produced in the mutual positional relationships between the unit part constructions stacked one upon another. Particularly, the pole teeth which are required to have a very high precision with respect to the mutual positional relationships are influenced to a great extent by the errors caused by the yoke and casing and the like, leading to fatal drawbacks, such as lowering of performance, especially, lowering of efficiency, of the miniature electric motor as the final product.

With respect to the foregoing drawback inevitably accompanying the conventional miniature electric motors, an explanation will be given referring to FIGS. 1 to 2 annexed hereto. FIGS. 1 to 2, respectively, are a sectional elevation of a representative form of conventional miniature electric motor and an exploded view of the main parts thereof. The exploded view is shown with an upper yoke, an exciting coil and a lower yoke cut in half.

In FIGS. 1 to 2, numeral 1 designates an upper yoke which also serves as a casing, and which have been produced by subjecting to press-processing a plate of a soft magnetic material such as pure iron or low carbon steel. The upper yoke 1 comprises a cylindrical peripheral wall portion 1a, an annular plate portion 1b and pole teeth 8 which are interconnected and formed integrally. Numeral 3 designates a lower yoke which has the same structure as that of the upper yoke 1, except that the former is smaller than the latter in outer diameter by the thickness of the latter. In each of the upper yoke 1 and lower yoke 3, the annular plate portion 1b, 3b has at its outer edge portion a cylindrical peripheral wall 1a, 3a extending perpendicularly to said plate portion, and has at its inner edge portion a plurality of pole teeth formed so as to extend in parallel with the above-mentioned cylindrical peripheral wall. The upper yoke 1 and lower yoke 3 are, as depicted, coaxially stacked through the exciting coil. The diameter of the inner peripheral portion of the annular plate portion 1b of 1 is the same as that of the annular plate portion 3b of 3. In each of the upper yoke 1 and lower yoke 3, pole teeth and spacings are alternately arranged, the width of each spacing being designed so as to be slightly larger than that of each pole tooth, thereby to form a family of pole teeth 8, 8'. With respect to 1 and 3, the number of pole teeth, dimension thereof, shape thereof and the like are the same. The outer diameter of the outer peripheral portion of the annular plate portion 3b of 3, namely, the outer diameter of the cylindrical peripheral wall 3a formed at the above-mentioned outer peripheral portion is slightly smaller than the inner diameter of the cylindrical peripheral wall 1a of 1. So, the outer periphery of the cylindrical peripheral wall 3a of 3 is closely fitted to the inner periphery of the cylindrical peripheral wall 1a of 1. With respect to the families of pole teeth 8, 8' of the mutually fitted 1 and 3, the respective pole teeth are inserted in the respective spacings in mutual relationship. In this instance, the respective pole teeth of a first family of pole teeth and the respective pole teeth, to be inserted in the respective spacings of the first family, of a second family of pole teeth opposite to the first family, should be alternately arranged with exactly equal intervals. Actually, however, it is extremely difficult or impossible to make such an arrangement, leading to lowering of performance of an electric motor as a final product.

In any way, as described above, the respective families of pole teeth of the upper yoke 1 and lower yoke 3 do, in combination, cooperate with the exciting coil 2 to form a stator of one phase. When the exciting coil is energized by an alternating current, in the families of pole teeth 8 and 8' respectively of 1 and 3, N and S poles are alternately developed according to time. With one combination producing one phase, the direction of rotation is not determined. For this reason, another combination of an upper yoke 5, an exciting coil 6 and a lower yoke 7 respectively having quite the same structures as those of 1,2 and 3 is provided in a lower decker to form a second phase. Thus, a directional rotation force is produced by a two-phase AC operation. Illustratively stated, using two pairs of families of pole teeth, each pair having two families of pole teeth mutualy inserted in the spacings of the families, four families of pole teeth in total are stacked. The upper stator comprising 1, 2, and 3 which constitute one phase of upper decker is angularly offset by an angle of 90° in terms of an electric angle with respect to a lower stator comprising 5, 6 and 7 which constitute another phase of lower decker. The exciting coil 2 is wound around a bobbin, and, as shown in FIG. 1, is accommodated in a spacing defined by 1 and 3, particularly by the annular plate portions 1b and 3b, cylindrical peripheral walls 1a and 3a, and the families of pole teeth 8 and 8'. When an alternating current is applied to the exciting coils 2 and 6 at their terminals (not shown), a magnetic circuit is formed within the annular plate portions 1b and 3b and cylindrical peripheral walls 1a and 3a, thereby energizing the pole teeth 8 and 8'. To the exciting coils 2 and 6 are respectively applied electric currents with a phase difference of 90° therebetween. A rotor 4 comprises a shaft and a two-decker magnetized cylindrical magnet coaxially surrounding the shaft and fixed thereto. The magnet has multiple poles, and N and S poles are alternately arranged circumferentially on the magnet. The number of poles of the manget is the same as that of the pole teeth opposite to the poles of magnet. A motor is assembled so that the rotor 4 is situated, through a spacing, in opposite relationship to the four families of pole teeth composed of two pairs of families of pole teeth, each pair having two families of pole teeth mutually inserted in the spacings of the families. An electric current is applied to the motor, there is produced torque. The rotor is rotatably held by a bearing 10 supported by a bearing support 9.

Each of the yokes 1, 3, 5 and 7 are produced by means of a press mold in an integral form. In that instance, the influence of the rolling orientation due to rolling of the material, influence of the clearance of a press mold, influence of the spring-back due to a press processing and the like are piled one upon another, so that the center of the circular arangement of pole teeth 8, 8' actually comes to be not in coincidence with the centers of the annular plate portions 1b, 3b and cylindrical peripheral walls 1a and 3a. Further, due to the three-dimensional press processing, the right angularity of the respective pole teeth relative to each annular plate portion 1b, 3b varies position to position, causing the center intended by designing to be different from the center obtained in the actual product. Furthermore, the center of the annular plate portion 1b, 3b is not in coincidence with the center of the cylindrical peripheral wall due to crooking of the cylindrical peripheral wall. Therefore, when the yokes are assembled, the respective centers of the families of pole teeth stacked are not in coincidence with one another. The defects as mentioned above are attributed to the press processing and to the non-uniformity in the physical, mechanical properties of the metallic material due to rolling orientation, and cannot be actually avoided in the conventional technigues. In fact, when parts are assembled into a miniature electric motor, a combination of the yokes 1 and 3 mutually fitted each other and another combination of the yokes 5 and 7 mutually fitted each other are piled to form a four-decker construction. Therefore, due to the cumulative error produced by accumulation of the respective errors of the yokes, not only the distances of the respective pole teeth from the axis but also the spacings between every adjacent pole teeth become non-uniform and, hence, the scales of the spacings between the respective pole teeth and the rotor disposed coaxially with the circular arrangement of the pole teeth 8, 8' become different tooth by tooth, thereby causing it impossible to ensure high precision spacings between the rotor and the respective pole teeth. The measure that has been taken to solve the above-mentioned problem, however, is limited from the viewpoint of reduction in cost because of mass production which is carried out with respect to miniature electric motors, and is only to provide gaps with a large surplus and to escape from the difficulty caused by the above-mentioned cumulative error by utilizing the clearances produced by the large surplus gaps, resulting in no radical solution of the problem. With such a measure of increasing the clearances, a large magnetic loss is caused and desired amount of torque cannot be obtained, leading to lowering in performance of the miniature electric motor.

In an electric motor, the provision of the spacing between a stator and a rotor is the most important factor with respect to performance of the electric motor. It is preferred that the spacing between a stator and a rotor be as small as possible. For this purpose, it is necessary to enhance precision of the constituent parts. However, the conventional techniques suitable for improving precision of the constituent parts of a miniature electric motors are limited, and the development of new techniques useful for overcoming the difficulties accompanying the conventional miniature electric motors has been demanded in the art.

With a view to overcoming the above-mentioned drawbacks and to developing constituent parts of a miniature electric motor which are simple in structure and extremely effective for enhancing precision in assembling a miniature electric motor, the present inventor has made intensive investigations. As a result, it has been found that when there is used a unit in which pole teeth are fixed together by means of a non-magnetic material so that the pole teeth is unified with the non-magnetic material, with at least one of both surfaces of the pole teeth exposed, the spacing between a stator and a rotor in a miniature electric motor can be not only reduced by a factor of several as compared to that in the conventional miniature electric motor, but also the extremely uniform spacing can be ensured. The present invention has been made based on such novel finding.

SUMMARY OF THE INVENTION

Accordingly, it is one object of the present invention to provide a novel pole teeth structure for use in a miniature electric motor, which can provide, with extremely high precision and uniformity, a predetermined spacing between a stator and a rotor in a miniature electric motor and can easily enhance precision in assembling constituent parts into a miniature electric motor, leading to extremely high performance of a miniature electric motor.

According to the present invention, there is provided a miniature electric motor comprising a plurality of pole teeth made of soft magnetic material, a coil accommodated in a bobbin and adapted to energize said pole teeth, and a magnet having alternating magnetic poles composed of N poles and S poles which are alternately arranged, said magnet being disposed relative to said pole teeth so as to produce torque therebetween, and wherein said pole teeth of soft magnetic material are fixed together by means of a non-magnetic material into a mass in which said pole teeth are unified with said non-magnetic material, each of said pole teeth having at least on its one side a surface which faces said magnet and is left exposed.

BRIEF DESCRIPTION OF DRAWINGS

The foregoing and other objects, features and advantages of the present invention will be apparent from the following detailed description and appended claims taken in connection with the accompanying drawings in which:

FIGS. 1 to 2 show the structures of the conventional electric motor and a family of pole teeth employed therein; FIGS. 3 to 4-(a) and 4-(b) show one form of a composite pole teeth structure for use in the present invention and a sectional elevation of a miniature electric motor with the composite pole teeth structure incorporated therein; FIGS. 5 to 6-(a) and 6-(b), FIGS. 7 to 8, FIGS. 9 to 10-(a), and 10-(b), FIGS. 11 to 12-(a) and 12-(b), and FIGS. 13 to 14-(a) and 14 (b) show other forms of a composite pole teeth structure for use in the present invention.

DESCRIPTION OF PREFERRED EMBODIMENTS

Figure 7:
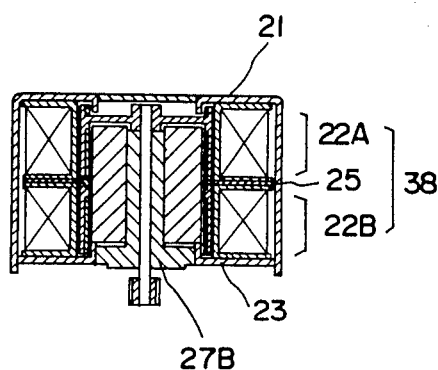

Now, the present invention will be explained in detail with reference to preferred embodiments of the present invention which are illustrated in the accompanying drawings. In FIGS. 3 to 18, for the purpose of clear understanding of the explanation of the essential portions, like parts and portions are designated by same or like numerals and characters, and they are occasionally omitted.

In FIGS. 3 to 4-(a) and 4-(b), there is shown a first embodiment of the present invention. FIG. 3 is a sectional elevation of a miniature electric motor with a composite pole teeth structure incorporated therein according to the present invention. FIGS. 4-(a) and 4-(b) show a partially exploded view of a main portion of the miniature electric motor of FIG. 3, with a stator portion cut in half.

In FIGS. 3 to 4-(a) and 4-(b), numeral 21 designates a yoke, which also serves as a casing, made of a plate of soft magnetic material. The yoke comprises an annular plate portion having at its central portion a bore and a cylindrical peripheral wall. Numeral 23 designates another yoke of an annular soft magnetic material plate, which has at its central portion a bore. The yoke 23 is closely fitted, at its outer periphery, to the inner periphery of the lower portion of the yoke 21. Bearings 27, 27 are respectively inserted in the central bores of the yokes 21 and 23 and closely fitted over the upper and lower ends of the pole teeth 41. The shaft of a rotor 24 is rotatably supported by the bearings. Alternatively, there may be employed a construction in which only one bearing 27 is provided and fitted over one of the both ends of the pole teeth 41. The rotor has around its axis a cylindrical magnet. The rotor and cylindrical magnet have a common axis. The magnet has circumferentially N poles and S poles which are alternately disposed, and the number of poles are the same as that of the pole teeth opposite to the poles. However, it is noted that the number of poles of the magnet need not be necessarily the same as that of the pole teeth. The upper and lower magnetic poles of the two-decker magnet are arranged to give a phase difference of 90° in terms of electric angle.

In the embodiment shown in FIGS. 3 to 4-(a) and 4-(b), the magnetic circuit is formed as follows. The pole teeth B are mutually connected through the medium of a connecting portion A to form a family of pole teeth 41. The spacings between the pole teeth in a family of pole teeth are, each, slightly larger than the width of a pole tooth. A pair of two families of pole teeth are disposed in mutually inserted relationship, with their respective connecting portions A disposed on the upside and downside, and the pole teeth are arranged at exactly equal intervals therebetween. Two pairs of families of pole teeth are stacked through an annular soft magnetic material plate 25 sandwiched therebetween. The upper and lower connecting portions A of a pair of families of pole teeth are in close contact with the circumferential edge portion of the central bore of the annular soft magnetic material plate 25 to form magnetic connection. The diameter of the central bore of the annular soft magnetic material plate 25 is the same as or slightly larger than the inner diameter of a cylinder assumed by the family of pole teeth. The outer periphery of the annular soft magnetic material plate 25 abuts against the inner wall of the yoke 21 as shown in FIG. 3. Thus, there is formed a magnetic circuit.

A composite pole teeth structure for use in the present invention may be produced as follows. The above-mentioned two pairs of families of pole teeth (four families in total) and the annular soft magnetic material plate 25 are fixedly unified, all together, by means of a non-magnetic material C. In that instance, using an appropriate metal mold, two coil bobbins 22A, 22B are simultaneously formed from a non-magnetic material C by molding [see the corresponding cross-section in FIG. 4-(a)]. The kind of non-magnetic material is not particularly limited, but there may be employed non-magnetic synthetic resins, such as a polyamide resin (Nylon etc.), a polycarbonate resin (Duracon etc.), a Bakelite (or phenol) resin, a polyphenylene oxide resin (Xylon etc.), fiber-reinforced plastics thereof, and the like. Those having an excellent heat resistance are especially preferred. With respect to the molding method, there is no restriction, but there may be employed a customary molding method in which pole teeth are disposed, as inserts, in a metal mold at its predetermined positions and then, a non-magnetic material is charged in the mold to effect molding together with the inserts [for example, see "Gosei Jushi Binran (Handbook of synthetic resins)", pages 454 to 456, published by Sangyo Tosho Kabushiki Kaisha, Japan, July 25, 1971)], a method in which pole teeth are disposed at predetermined positions by means of a jig and/or tool and a non-magnetic material is then adhesion-attached thereto, and the like. In general, the techniques of injection molding, vacuum filling, hot press attaching, adhesion, etc. may be utilized. In this embodiment, the annular soft magnetic material plate 25 also is simultaneously fixedly unified with the pole teeth and, at the same time, the coil bobbin is simultaneously, integrally formed by molding. However, as shown in a second embodiment given later, there may be employed a method in which two pairs of families of pole teeth (four families in total) may first be fixedly unified together by means of a non-magnetic material to obtain a composite pole teeth in a cylindrical form, which, in turn, is inserted in a bobbin cylinder which has been obtained by molding two bobbins together with an annular soft magnetic material plate 25. In this case, in order to establish insulation from the coil, it is necessary to coat the annular soft magnetic material plate with an insulating material. Alternatively, either an annular soft magnetic matierial plate or a coil bobbin may first be fixedly unified with pole teeth by means of a non-magnetic material and, then, the remainder may be inserted thereinto.

Each pole tooth of the pole teeth unified together by means of a non-magnetic material as mentioned above must be exposed at its surface facing the rotor (similarly, in the case where a family of pole teeth serve as a rotor as shown in a further embodiment given later, each pole tooth should be exposed at its surface facing a stator).

The unified pole teeth as prepared above assume a uniform cylindrical form in which the inner wall surfaces of the pole teeth are arranged with high regularity. The pole teeth in unified cylindrical form are exactly, fixedly disposed in predetermined mutual relationships with respect to axial and circumferential arrangement and stable to the external force. The unified pole teeth is of a structure in which a non-magnetic material is filled within the spacings between the respective mutually adjacent pole teeth and each pole tooth is embedded in the cylindrical wall having a thickness corresponding to the thickness of a conventional coil bobbin. Each pole tooth fixedly disposed in a predetermined position of the inner wall of the cylindrical unified pole teeth assembly has high precision in the distance of each pole tooth from the axis and, therefore, the spacing between each pole tooth and the rotor can be easily determined with extremely high precision, thus enabling the performance of a miniature electric motor to be extremely improved.

In this connection, it is noted that after preparation of the unified pole teeth assembly as mentioned above, the connecting portions A may be cut off according to need. In this case, however, it is necessary to provide direct contact of each pole tooth B with a yoke portion so that a magnetic circuit may be continuously formed. Where the connecting portions A are cut off, there is obtained such an advantage that, for example, when the composite pole teeth assembly is used as a rotor in a pulse motor, the pulse response is improved since the inertia is small.

As described before, in the conventional pole teeth structure, the influence of the rolling orientation due to rolling of the material, influence of the spring-back due to a press processing and influence of the clearance of a press mold are unavoidable, causing not only the spacings fo the respective pole teeth to the axis to be non-uniform but also the entire pole teeth structure to have eccentricity and cumulative error due to piling of the constituent parts. Thus, with the conventional pole teeth structure, it is impossible to provide a spacing between a rotor and a stator with high precision. In the composite pole teeth structure for use in the present invention, however, there are no portions adversely influencing provision of high precision, and, pole teeth alone or in combination with other necessary parts can be disposed at predetermined positions by means of a metal mold, jig or tool and then can be unified together by means of a non-magnetic material to fix them in a stable form. Therefore, in assembling a miniature electric motor, the high precision mutual positional relationships between the constituent parts can be attained. Further, it should be noted that since the pole teeth are formed in a unitary mass, machine work such as cutting, grinding, etc. can be applied with ease, so that the spacing between a rotor and a stator can be small and uniform with high precision, leading to increase in the effeciency of an electric motor. The advantages of the present invention will be summarized below.

(1) Improvement in performance

It is well known that the performance of an electric motor is influenced by the spacing between a stator and a rotor to a greater extent than by any other factors. According to the present invention, occurrence of any cumulative error due to piling of parts and non-uniform arrangement of the respective pole teeth relative to the axis can be completely eliminated. Illustratively stated, for example, parts including a predetermined number of pole teeth, and an annular soft magnetic material plate are unified together so as to have an exact predetermined inner diameter by means of a metal mold and, at the same time, the respective parts thus unified are exactly fixed at predetermined positioned with respect to axial and circumferential arrangement, thereby causing no error to occur. Therefore, the pole teeth alone or in combination with other necessary parts can be stably fixed with high precision in predetermined mutual positional relationship, and do not undergo distortion. In this way, a predetermined spacing between a stator and a rotor can be provided with high precision and with uniformity, leading to not only considerable reduction in steps for assembling an electric motor but also remarkable improvement in performance of the electric motor.

(2) Reduction in cost

The cost for the production of electric motors can be reduced by using the present pole teeth structure. In the conventional electric motor, four cylindrical peripheral wall portions and four annular plate portions are necessary, however, they are substituted by only the yokes 21 and 23 and the annular soft magnetic material plate 25 in the case of an electric motor using therein the present pole teeth structure. Illustratively stated, when the present pole teeth structure is used, two annular plate portions are not necessary but one annular soft magnetic material plate is sufficient for forming a magnetic circuit common to the first and second phases.

Further, four families of pole teeth are formed in a unitary mass and, therefore, the complicated working procedures for assembling such four families of pole teeth can be omitted. Two coil bobbins can also be unified, coil winding around the two bobbins can be simultaneously performed, leading to half-reduction in the coil winding step. Consequently, not only prevented is occurrence of the cumulative error causing non-uniformity in the pole teeth arrangement, but also the number of constituent parts is reduced and the working procedure can be simplified.

As described with reference to FIGS. 1 and 2, in the case of the conventional electric motor, first, 1, 2 and 3 of the first group must be assembled and, next, 5, 6 and 7 of the second group must be assembled. In that instance, the assembling of each group should be done so as to arrange the pole teeth in equal intervals with high precision. Actually, however, it is impossible to perform provision such equal intervals between the mutually adjacent pole teeth with high precision. Therefore, conventionally, as described before, in order to escape from such difficulty, attempts have been made to provide the surplus clearances which are not so effective but rather cause the performance of the electric motor to be lowered. More, the first group thus assembled and the second group thus assembled ust be assembled and fixed together so as to have a phase difference of 90° C. in terms of electric angle therebetween, which necessitates complicated procedures. Even with such complicated procedures, in the conventional electric motor, the eccentricity and cumulative error caused by piling of four yokes cannot be avoided. According to the present invention, with a composite pole teeth structure of simple construction, the above-mentioned drawbacks accompanying the conventional electric motor can be obviated. The simple structure of the present miniature electric motor contributes to considerable reduction of cost for the production thereof.

(3) Suitability for mass production

As described above, the unification of pole teeth by means of a non-magnetic material contributes to non-occurrence of the cumulative error, simplification in structure and reduction in total number of parts. Thus, the quality control of necessary parts is facilitated and the number of steps necessary for assembling is reduced, leading to high suitability for mass production.

An explanation has been given above with reference to the first embodiment as one preferred embodiment. Further embodiments will be described.

FIGS. 5 to 6-(a) and 6-(b)- show a second embodiment. As different from the first embodiment in which the pole teeth are unified with the coil bobbins, four families of pole teeth is fixedly unified in the form of a pole teeth cylinder 37, and separately, two coil bobbins with an annular soft magnetic material plate 25 sandwiched therebetween are fixedly unified in the form of a bobbin cylinder 38. The pole teeth cylinder 37 shown in FIG. 6-(b) is prepared by a method in which four families of pole teeth are disposed in a metal mold at its predetermined positions and a non-magnetic material C is charged in the metal mold to effect unification. The pole teeth cylinder thus obtained is highly precise in inner and outer diameters. Connecting portions A, A respectively of the upper and lower groups of pole teeth are bent toward the outer periphery of the pole teeth cylinder, and the outer ends of the bent portions of connecting portions terminate at the outer peripheral surface of the pole teeth cylinder. The other connecting portions A', A' respectively of the upper and lower groups of pole teeth are, similarly to those in the first embodiment, bent toward the outer periphery of the pole teeth cylinder, or not bent, to contact a yoke (see FIG. 3). The bobbin cylinder 38 is prepared by a method in which an annular soft magnetic material plate 25 is disposed in a metal mold at its predetermined position and a non-magnetic material is charged to effect unification simultaneously with formation of two coil bobbins by molding. The inner diameter of the bobbin cylinder 38 is quite the same as that of the annular soft magnetic material plate 25. The pole teeth cylinder 37 is inserted in the bobbin cylinder 38, and the outer periphery of the former has close contact with the inner periphery of the latter. The inner peripheral edge of the annular soft magnetic material plate is brought into contact with the connecting portions A, A to form a magnetic circuit. The pole teeth shown in FIGS. 5 to 6-(a) and 6-(b) are of triangular shape, but they may be of a rectangular shape as shown in FIGS. 3 to 4-(a) and 4-(b). The bobbin cylinder 38 has two bobbins unified together and, therefore, coil winding around the two bobbins can be performed at the same time. Moreover, it is noted that simultaneously with the coil winding operation, assembling using the pole teeth cylinder 37 can be conducted. In the same way as shown in FIG. 3, a bearing 27 is provided at least on the side of one end of the pole teeth cylinder 37, and a rotor 24 is inserted into the bearing so as to be supported thereby. The pole teeth cylinder 37 is inserted into the bobbin cylinder 38 (an adhesive may be applied according to need). Thus, the production can be effectively conducted.

Figure 8:
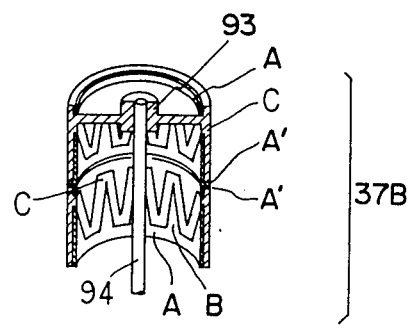

FIGS. 7 to 8 show a third embodiment.

FIG. 8 shows a pole teeth structure constructed in the form of a rotor 37B. At the time when pole teeth and a boss 93 are unified together by means of a non-magnetic material C, a shaft is also fixedly unified with the boss to form a pole teeth cylinder made rotor 37B.

FIG. 7 shows a sectional elevation of one form of a miniature electric motor in which the pole teeth cylinder-made rotor 37B is incorporated. In the inner periphery of the bobbin cylinder is inserted the outer periphery of the pole teeth-made rotor 37B, leaving an appropriate spacing therebetween. Connecting portions A, A formed in the rotor 37B at its upper and lower portions are respectively communicated with yokes 21, 23 through a small gap to form a magnetic circuit. Connecting portions A', A' in the central portion of the rotor are communicated with the inner peripheral edge of an annular soft magnetic material plate 25 through a small gap to form a magnetic path. The pole teeth cylinder-made rotor 37B is rotatably supported by a bearing 27B through a shaft 94. The bearing 27B is fixedly-inserted in the center of the yoke 23, and supports a magnet 24' which is the same as the rotor 24 shown in FIG. 4-(b) and serves as a stator. The pole teeth cylinder-made rotor 37B is accommodated in a construction which is formed of the yokes 21 and 23 and serves also as a casing.

FIGS. 9 to 10-(a) and 10-(b) show a fourth embodiment.

In each of the above-mentioned embodiments, there are employed four families of pole teeth. However, even with one or two families of pole teeth, a miniature electric motor may be constructed in accordance with the present invention. With respect to a rotor 37B as shown in FIG. 8, also, practice of the present invention may be made with two families of pole teeth.

In FIG. 9, there is shown a main portion of a miniature electric motor embodying the present invention, in which there is used a cup-like cylinder. The upper and lower portions of the cylinder constitute connecting portions A, A'. The upper connecting portion A assumes a circular plate which is formed so as to close the upper opening of the cylinder, while the lower connecting portion A' is constituted by a flange portion developing outwardly. Pole teeth are formed circumferentially of the periphery of the cylinder portion, and the spacings between the mutually adjacent pole teeth are constituted by a space traversing the cylinder. The width of each pole tooth is minimum at its central portion and is maximum at its portions respectively terminating at A and A'. The above-constructed pole teeth are fixedly unified with a coil bobbin into a unitary mass by means of a non-magnetic material C. Thus, there is obtained such structure that the pole teeth are embedded in the inner periphery of a conventional bobbin. The thickness of the non-magnetic material layer at its portions corresponding to the positions of the pole teeth becomes small. A, A' in FIG. 9 may alternatively be constructed in the same manner as shown in FIGS. 10-(a) and 10-(b). In FIGS. 10-(a) and 10-(b), structures 81 and 82 respectively show forms in which connecting portions A, A' are arranged in vertical relationship and in parallel relationship with respect to the axis. The portions A, A' may be cut off after unification of the pole teeth. In this case, the pole teeth directly contact a yoke portion to form a magnetic circuit.

FIGS. 11 to 12-(a) and 12-(b) show a fifth embodiment of the present invention.

In each of the above-mentioned embodiments, the pole teeth are arranged in parallel with the axis and arranged so as to coaxially surround the axis. In FIG. 11, pole teeth are arranged normally and radially relative to the central axis of an annular plate unified with a coil bobbin by means of a non-magnetic material C. Pole teeth B and pole teeth B' are alternately arranged. A connecting portion A is along the outer periphery and a connecting portion A' is along the inner periphery. The connecting portion A is communicated with the pole teeth B while the connecting portion A' is communicated with B'. In FIG. 11, the pole teeth B and B' arranged on the annular plate portion of a coil bobbin 71 in unified form are on the same plane. The inner periphery connecting portion A' is magnetically connected at its line portion $A_2'$ to a yoke $A_3'$, but according to convenience of working, the yoke $A_3'$ may be integral with or separate from the connecting portion A'. After the fixed unification of the pole teeth with the bobbin 71, the connecting portions may be cut off and direct contact of the pole teeth with the yoke portion may be established to form a magnetic circuit. The pole teeth may be of other shape, and only one family of pole teeth may be used. FIGS. 12-(a) and 12-(b) show one form of an electric motor in which the composite structure of FIG. 11 is incorporated. Numeral 74 designates a casing serving also as a yoke, which is constituted by a cylindrical portion and an annular plate portion. The connecting portion A is fitted to the inner wall of the cylindrical portion of the casing 74 and the portion $A_3'$ is in close contact with the annular plate portion of the casing 74, thereby forming a magnetic circuit. Within the portion $A_3'$ is fixedly inserted a bearing 76. A shaft 77 of a rotor 73 is rotatably supported by the bearing. A circular shape magnet 73 employed as the rotor 73 is provided with equal numbers of N poles and S poles which are radially extended and alternately arranged. The circular shape magnet and the pole teeth are disposed in opposite relationship through a small gap. When electric current is applied to a coil wound around the coil bobbin, there is produced a rotating force.

FIGS. 13 to 14-(a) and 14-(b) show a sixth embodiment of the present invention.

In FIGS. 11 to 12-(a) and 12-(b) illustrating the fifth embodiment, there is used as a stator the pole teeth arranged on a circular plane. But, in this embodiment, as illustrated in FIGS. 13 to 14-(a) and 14-(b), pole teeth are used as a rotor. A circular rotor 81 shown in FIG. 13 is prepared by a method in which simultaneously with unification of pole teeth together into an annular plate shaped mass by molding, a shaft 77 is attached to the mass to form a rotor of a flat annular shape.

FIGS. 14-(a) and 14-(b) show one form of a miniature electric motor in which the above-mentioned rotor is incorporated. Numeral 74 designates a yoke serving also as a casing, which comprises an outside cylindrical portion, an inside cylindrical portion and an annular plate portion for connecting both the cylindrical portions at their respective one ends to form an annular bottom. The other end of each of the cylindrical portions is left open. Between the both cylindrical portions is accommodated a coil 75. Connecting portions A and A' of the rotor 81 are respectively communicated with the outside and inside cylindrical portions through a gap to form a magnetic circuit. The rotor 81 is rotatably supported by a bearing 76 fixed within the inside cylindrical portion. A magnet of an annular shape is fixedly attached to the yoke 74 by means of a support 83. The annular magnet 73 is provided with equal numbers of N poles and S poles which are radially extended and alternately arranged. The annular face of the magnet and the pole teeth are disposed in opposite relationship through a gap therebetween. When alternating current is applied to the coil 75, there is produced a rotating force between 73 and 81.

In the fifth and sixth embodiments as described above, there are two forms of miniature electric motors respectively employing a non-magnetic material-unified pole teeth of a flat circular shape as a stator and a rotor. When a circular pole teeth structure in which pole teeth are arranged on a plane is produced according to a conventional method, a pressing or punching technique is employed. But, when pressing is employed, there is inevitably clearance between a male mold and a female mold, which clearance is non-uniform over the entire circumference In the case of punching, it is impossible to effect exact cutting over the entire circumference with high precision. Moreover, due to rolling orientation and spring-back of the material plate, twisting, distortion, bending and the like inevitably occur in a product with non-uniformity. Therefore, when such a defective product is incorporated in an electric motor, the spacing between an annular magnet and a pole teeth becomes non-uniform, rendering it impossible to provide a stable, high precision spacing. In contrast, according to the present invention, irrespective of a yoke portion and other portions adversely affecting the desired precision, only pole teeth are disposed, for example, in a metal mold at its predetermined positions while keeping exact flatness, and fixedly unified together by means of a non-magnetic material, and, therefore, there can be obtained a flat pole teeth structure which is stable and precise with respect to intervals between the teeth and flatness.

In the fourth, fifth and sixth embodiments, a phase structure may be changed to that of two-phase, thereby enabling the motors to be given rotational directivity. On the other hand, even with one-phase structure, if an electronic circuit containing a Hall element incorporated, the motor is given rotational directivity.

Figure 15:
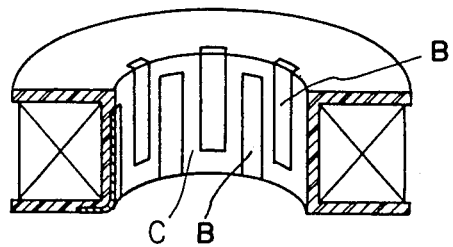
FIGS. 15 to 18 show modifications of the above-mentioned composite pole teeth structures.
Figure 16:
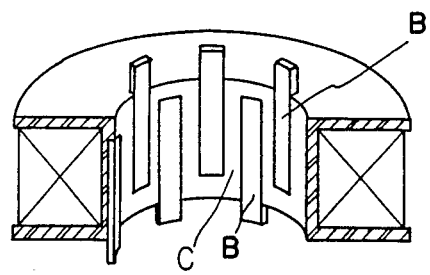
Figure 17:
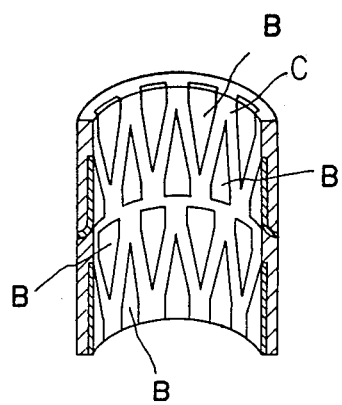
Figure 18:
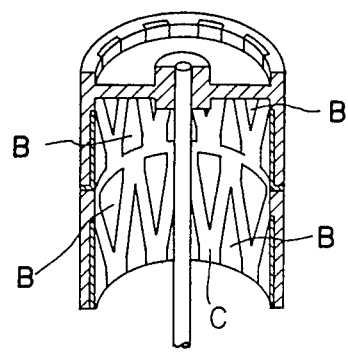

In connection with the first embodiment, it is described that the connecting portion A of the pole teeth [see FIGS. 3 to 4-(a) and 4-(b)] may be cut off. Illustrative examples of such modification will be described below with reference to FIGS. 15 to 18. In FIGS. 15 and 16, there are shown modifications in which the connecting portions A (not shown), A' are cut off from the pole teeth structure 82 shown in FIG. 10-(b). With respect to a pole teeth structure of FIG. 15, the top sections of pole teeth are contacted with a yoke serving also as a casing of an electric motor, thereby to form a magnetic circuit. With respect to a pole teeth structure of FIG. 16, the upper projecting portions of pole teeth is engaged with the inner wall of the bore of a casing serving also as a yoke of an electric motor, thereby to form a magnetic circuit. FIG. 17 shows a modification in which the pole teeth-connecting portions A, A' (not shown) are cut off from the pole teeth cylinder 37 shown in FIG. 6-(b), leaving pole tooth portions unremoved. FIG. 18 shows a modification in which the pole teeth-connecting portions A, A' (not shown) are cut off from the pole teeth cylinder-made rotor 37B shown in FIG. 8, thereby enabling the weight of the rotor is reduced, leading to improvement in pulse response due to a decreased inertia.

What is claimed is:

1. A method of manufacturing a composite toothed pole structue in a miniature electric motor, wherein said motor includes an annular fixed coil, a circular permanent magnet, a plurality of pole teeth made of a soft magnetic material, and a yoke of a soft magnetic material in operative contact with said pole teeth and forming a casing and a continuous magnetic circuit through said plurality of pole teeth, said coil magnet, pole teeth and yoke all being co-axial with one another, said magnet having N and S poles alternating circumferentially, and each pole of said magnet corresponding to one of said pole teeth to form a pair of poles, one of each of said pair of poles forming a rotor and the other of each of said pair of poles forming a stator, said method comprising the steps of:

forming said pole teeth and said connecting portion from a single plate of soft magnetic material such that said pole teeth extend axially from said connecting portion;

forming said yoke into a casing from a single plate of soft magnetic material;

positioning said plurality of pole teeth as inserts in an annular mold;

charging said annular mold ith a non-magnetic, synthetic resin to form a bobbin for receiving said core, such that said plurality of pole teeth forming a stator are embedded annularly in said synthetic resin to form a single solid unified structure such that each of said pole teeth has an exposed side facing a corresponding pole of said permanent magnet; and joining said yoke with said connecting portion to form a continuous magnetic circuit including said yoke and said pole teeth.

2. The method of claim 1, wherein said pole teeth are formed around said connecting portion in a cylindrical fashion to extend axially and generally perpendicularly therefrom.

3. The method of claim 1, wherein said positioning step includes positioning at least two layers of said plurality of pole teeth in said mold before charging said mold with said non-magnetic, synthetic resin.

4. The method of claim 3, including the step of inserting an annular soft magnetic plate between said two layers of pole teeth.

5. The method of manufacturing of claim 1, wherein said synthetic resin is selected from the group consisting of polyamide resin, polycarbonate resin, phenol resin, polyphenylene oxide resin, and fiber reinforced plastic resin.

6. A method of manufacturing a composite toothed pole structure in a miniature electric motor, wherein said motor includes an annular fixed coil, a circular permanent magnet, a plurality of pole teeth made of a soft magnetic material, and a yoke of a soft magnetic material in operative contact with said pole teeth and forming a casing and a continuous magnetic circuit through said plurality of pole teeth, said coil magnet, pole teeth and yoke all being co-axial with one another, said magnet having N and S poles alternating circumferentially, and each pole of said magnet corresponding to one of said pole teeth to form a pair of poles, one of each of said pair of poles forming a rotor and the other of each of said pair of poles forming the stator, said method comprising the steps of:

forming said pole teeth and said connecting portion from a single plate of soft magnetic material such that said pole teeth extend axially from said connecting portion;

forming said yoke into a casing from a single plate of soft magnetic material;

positioning said plurality of pole teeth as inserts in annular mold;

charging said annular mold with a non-magnetic, synthetic resin to form a cylinder such that said plurality of pole teeth, forming a rotor, are embedded annularly in said synthetic resin to form a single solid unified structure such that each of said pole teeth has an exposed side facing a corresponding pole of said permanent magnet; and operatively connecting said yoke to said connecting portion.

7. The method of claim 6, wherein said pole teeth are formed around said connecting portion in a cylindrical fashion to extend axially and generally perpendicularly therefrom.

8. The method of claim 6, wherein said positioning step includes position at least two layers of said plurality of pole teeth in said mold before charging said mold with said non-magnetic, synthetic resin.

9. The method of claim 6, including the step of inserting an annular soft magnetic plate between said two layers of pole teeth.

10. The method of claim 6, wherein said pole teeth comprise a pole teeth cylinder having a boss on one end thereof attached to a shaft disposed axially within said pole teeth cylinder.

* * * * *